United States Patent [19]

Yasukawa

[11] Patent Number: 5,168,300
[45] Date of Patent: Dec. 1, 1992

[54] TTL AUTOMATIC FLASH CONTROL DEVICE

[75] Inventor: Seiichi Yasukawa, Kawasaki, Japan

[73] Assignee: Nikon Corporation, Tokyo, Japan

[21] Appl. No.: 796,789

[22] Filed: Nov. 25, 1991

[30] Foreign Application Priority Data

Nov. 29, 1990 [JP] Japan .................. 2-332137

[51] Int. Cl.$^5$ ............................................. G03B 15/05
[52] U.S. Cl. .................................... 354/415; 354/416
[58] Field of Search ............... 354/412, 413, 415, 416, 354/417

[56] References Cited

U.S. PATENT DOCUMENTS 5,006,879 4/1991 Takagi .......................... 354/416 X
5,130,737 7/1992 Azuma et al. ...................... 354/416

Primary Examiner—W. B. Perkey
Attorney, Agent, or Firm—Shapiro and Shapiro

[57] ABSTRACT

A TTL automatic flash control device for a flash light source for a camera is disclosed. The device has a flash control unit for controlling flashing of the flash light source. In sequential flashing photographic operation mode in which a plurality of flashing photographic operations are conducted sequentially, the flash control unit preliminarily flashes the flash light source at least once before the series of flashing photographic operations are initiated. Thereafter, the flash control unit performs main flashing of the flash light source for each shot. The device further includes a weighting value operating unit for detecting distribution of reflected light regarding a plurality of photometric areas obtained by dividing a field during the preliminary flashing and for calculating a weighting value for each of the photometric areas on the basis of the distribution of the reflected light, and a quantity of light control unit for metering each of the photometric areas on the basis of the weighting value thereof during the main flashing and for controlling a quantity of light emitted from the flash light source.

3 Claims, 8 Drawing Sheets

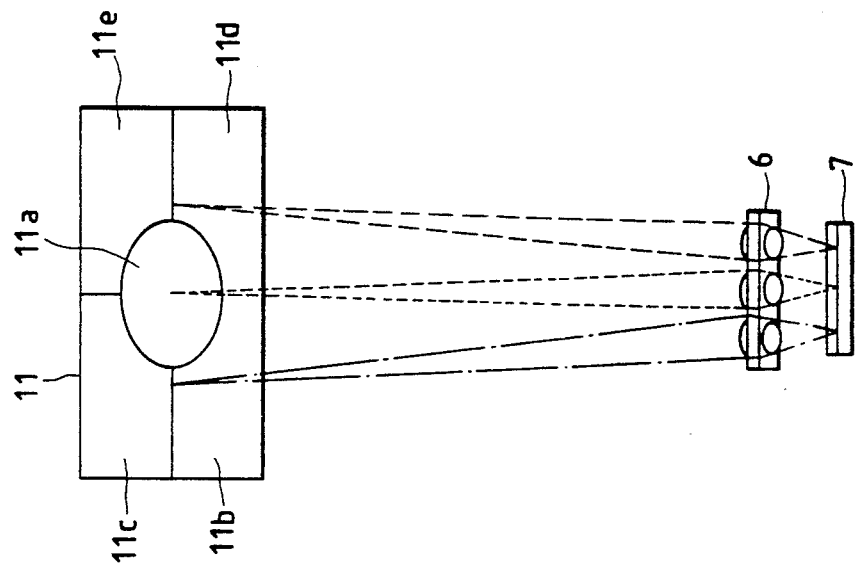
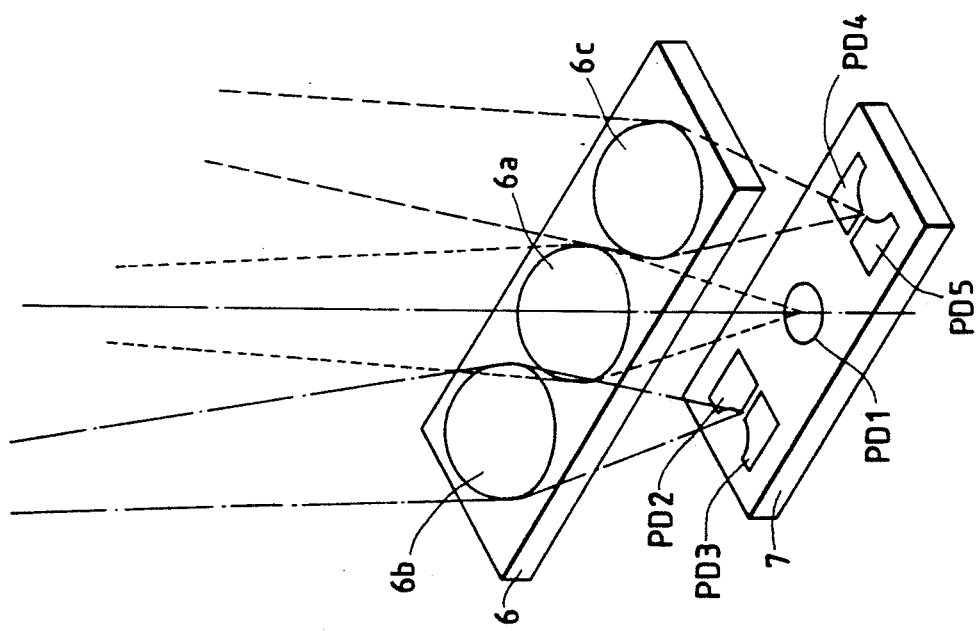

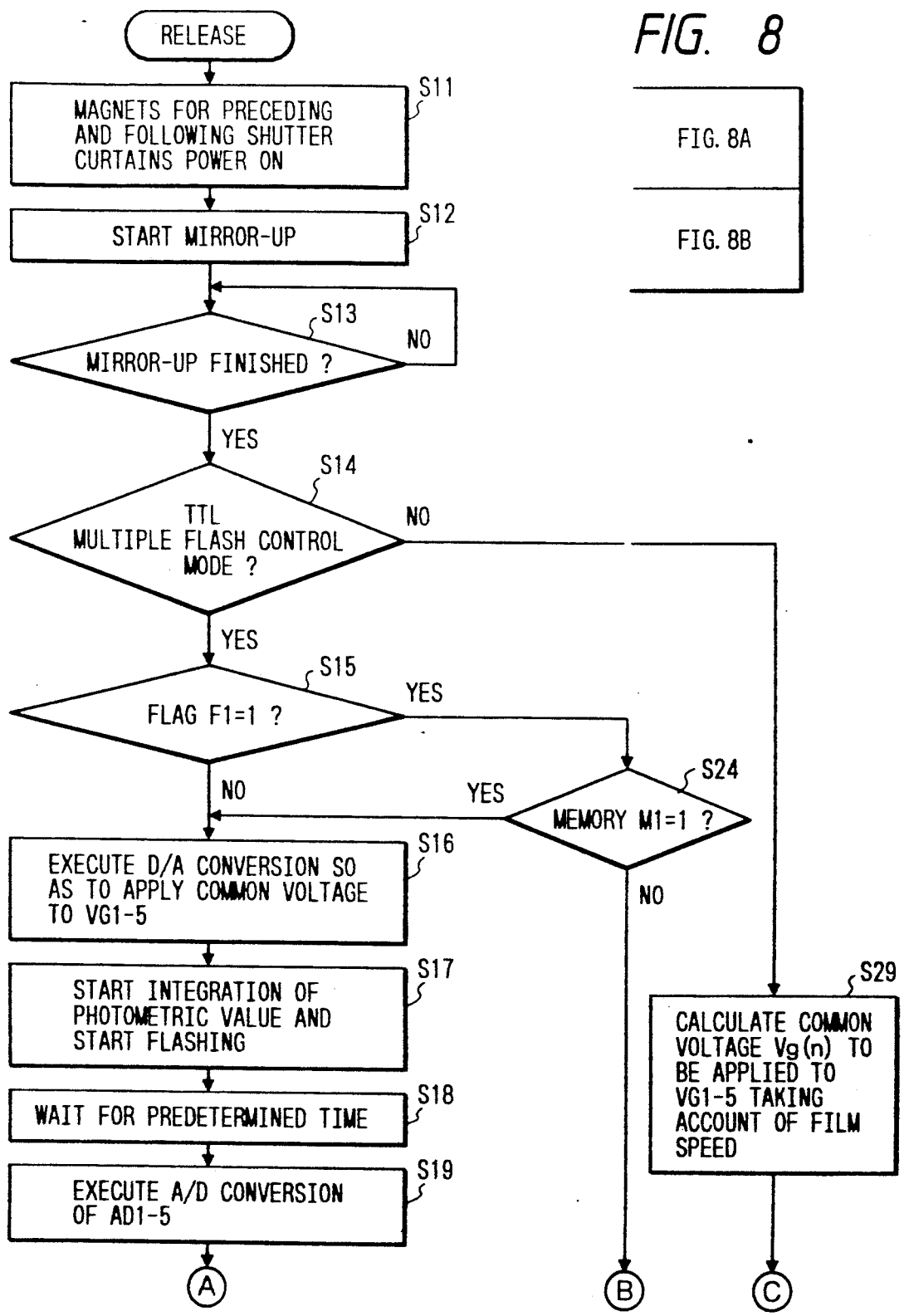

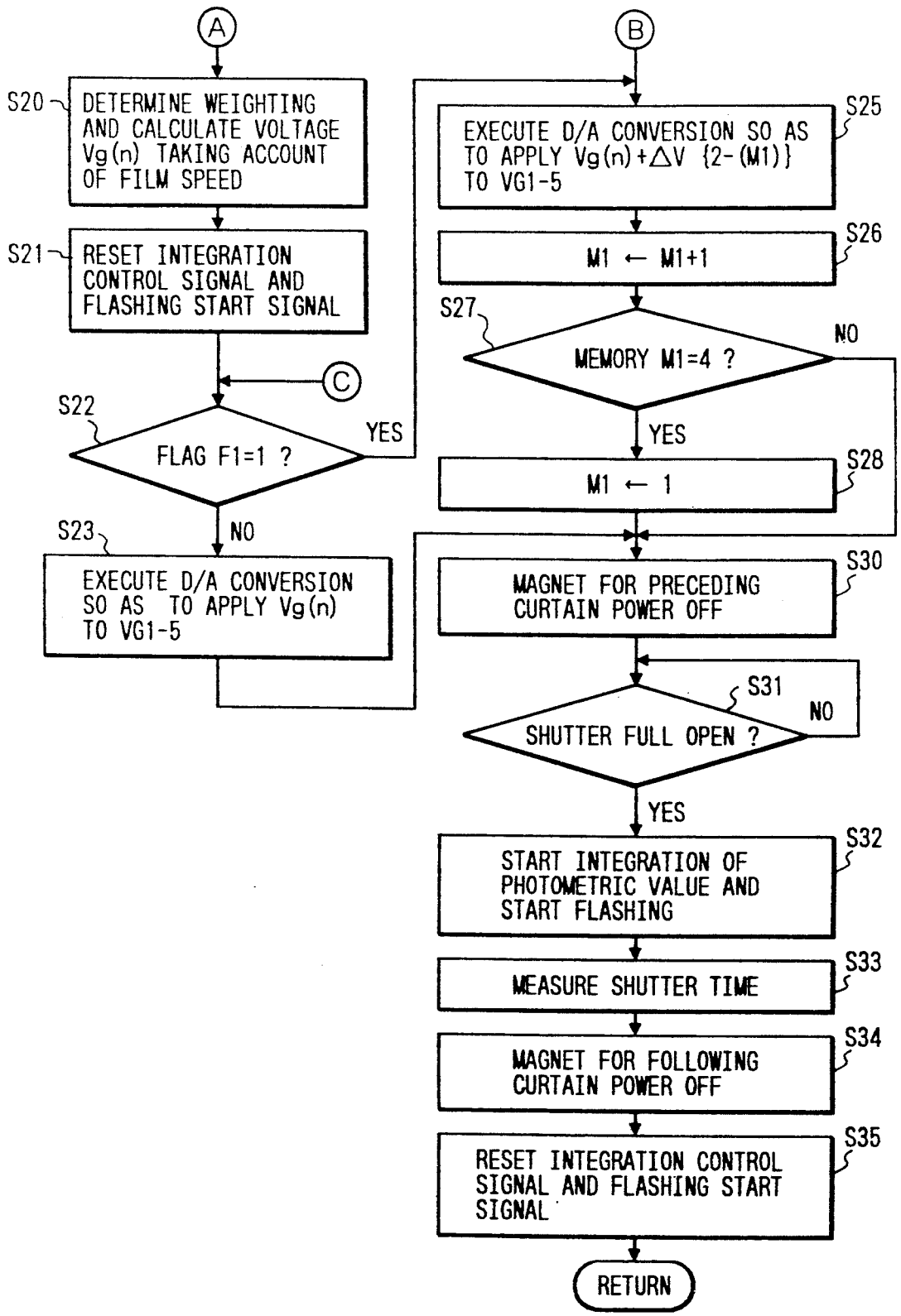

TTL AUTOMATIC FLASH CONTROL DEVICE

BACKGROUND OF THE INVENTION

1. Field of the Invention

The present invention relates to a TTL automatic flash control device for cameras which is designed to control the intensity of light which is flashed by a flash light source on the basis of the intensity of light from a subject which is made incident through a taking lens when a picture is taken using a flash light.

2. Related Background Art

TTL automatic flash control devices for camera, which are designed to control the intensity of light flashed by a flash light source when pictures are taken using a flash light are known.

The aforementioned type of device has a single light-receiving element for receiving light reflected from the entire surface or a major portion of a film surface. The above device controls the intensity of light flashed by a flash light source on the basis of the intensity of light from a subject which is detected by the light-receiving element when pictures are taken using a flash light. More specifically, flashing of the flash light source is initiated after a shutter is fully opened, and the light from the subject which is reflected by the film surface is received by the light-receiving element. When an integrated value of the intensity of light received reaches a predetermined value, flashing of the flash light source is suspended and the intensity of light which is flashed from the flash light source is thereby controlled so that a picture can be taken using a flash light at a predetermined exposure value.

However, in the conventional device of the aforementioned type, since the light reflected by the entire surface or the major portion of a film is received by the single light-receiving element, flashing is controlled on the basis of the mean intensity of light of an entire field in the former type or on the basis of the intensity of light of the major portion of the field in the latter type. Hence, detailed states of the field cannot be taken into account when flashing control is performed. For example, an adequate exposure of the major portion of the subject on which the photographer desires to take a picture may not be able to be obtained.

In recent years, technologies for overcoming such a problem of the conventional device have been developed. For example, the present applicant has proposed a multiple pattern metering type TTL automatic flash control device (U.S. Ser. No. 560,745).

In the above device, the light reflected by the film surface is received by a photoelectric converter made up of a plurality of light-receiving elements for respectively metering a plurality of areas of a field, and the quantity of light which is flashed by the flash light source is controlled. More specifically, the flash light source is preliminarily flashed immediately before a focal-plane shutter is opened. During the flashing, the rays of light from the subject are reflected by the surface of a shutter curtain, and those reflected rays of light are received by the photoelectric converter. Thereafter, distribution of the field reflected light is detected by separately integrating the outputs of the light-receiving elements. The field reflected light distribution data is processed according to a predetermined multiple pattern algorithm to determine the weighting value of each of the photometric areas which ensures the optimum exposure value of the major subject. Next, main flashing of the flash light source is performed immediately after the shutter is opened, and the light reflected by the surface of the film is received by the photoelectric converter. The output of each of the light-receiving elements of the photoelectric converter is weighted according to the weighting value thereof, and the sum of the weighted values is integrated. When the integrated value reaches a predetermined value, flashing of the flash light source is suspended, and main flashing is thereby completed. Hereinafter, such a flashing control method is referred to as a TTL multiple flashing control.

Flashing energy for the flash light source is stored in a main capacitor incorporated in the flashing control device. There is a limitation to the external dimensions of the general flash light source, and hence the flash light source cannot incorporate a main capacitor having a large capacity which enables it to flash a few times in a very short period of time.

However, in the aforementioned TTL multiple flashing control device, since preliminary flashing is conducted prior to the flashing photography which uses the main flashing, when flashing photographic operations are conducted sequentially, charging energy of the main capacitor may become in short supply and flashing may thus be disabled before the flashing photography is completed.

Particularly, in the bracketing photography in which pictures are taken in sequence on a plurality of frames at gradually changing exposure values, preliminary and main flashings are repeated a number of times corresponding to the number of frames in a short period of time. Hence, at the end of series of frames, a shutter may be released in a disabled flashing state.

SUMMARY OF THE INVENTION

An object of the present invention is to provide a TTL automatic flash control device which enables a number of times the preliminary flashing is conducted prior to the main flashing to be reduced to a minimum value in order to save flashing energy and thereby assure high-speed sequential flashing photography.

According to the invention, there is provided a TTL automatic flash control device for a flash light source for a camera, which comprises flash control means for controlling flashing of the flash light source, in sequential flashing photographic operation mode in which a plurality of flashing photographic operations are conducted sequentially, the flash control means preliminarily flashing the flash light source at least once before the series of flashing photographic operations are initiated, thereafter, the flash control means performing main flashing of the flash light source for each shot, weighting value operation means for detecting distribution of reflected light regarding a plurality of photometric areas obtained by dividing a field during the preliminary flashing and for calculating a weighting value for each of the photometric areas on the basis of the distribution of the reflected light, and quantity of light control means for metering each of the photometric areas on the basis of the weighting value thereof during the main flashing to control a quantity of light emitted from said flash light source.

In the sequential flashing photographic operation mode, the flash control means preliminarily flashes the flash light source at least once before the sequential flashing photographic operation is started. The weighting value calculation means detects distribution of reflected light for each of a plurality of photometric areas obtained by dividing a field during the preliminary flashing and calculates a weighting value for each of the photometric areas on the basis of the reflected light distribution. Thereafter, the flash control means performs main flashing of the flash light source. At that time, the quantity of light control means meters each of the photometric areas on the basis of the weighting value thereof to control the quantity of light during the main flashing. The schematic configuration of the TTL automatic flash control device is illustrated in FIG. 1.

As stated above, in the present invention, when the sequential flashing photographic operation mode is selected, preliminary flashing of the flash light source is conducted at least once before the sequential flashing photography is started. The weighting value for each of the plurality of photometric areas of the field is calculated on the basis of distribution of reflected light regarding the photometric areas during the preliminary flashing. In the flashing photography, each of the photometric areas is metered on the basis of the weighting value thereof to control a quantity of light during the main flashing. Hence, the number of times preliminary flashing is conducted for the sequential flashing photographic operation can be minimized. Consequently, the charging energy for the capacitor of the flash light source can be saved, and high-speed sequential flashing photographic operation can be achieved.

BRIEF DESCRIPTION OF THE DRAWINGS

FIG. 3 illustrates the positional relationship between a photoelectric converter and a condenser lens;

FIG. 4 illustrates the optical relationship between an aperture area of a film surface, the condenser lens and the photoelectric converter;

FIG. 8, composed of FIGS. 8A and 8B, is a flowchart showing a release subroutine of the main control program of FIG. 7.

DETAILED DESCRIPTION OF THE PREFERRED EMBODIMENTS

Figure 1:
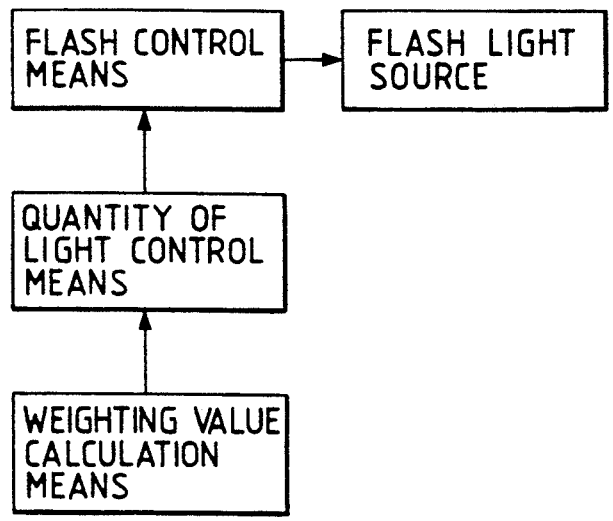
FIG. 1 is a schematic view of a device of the present invention.
Figure 2:
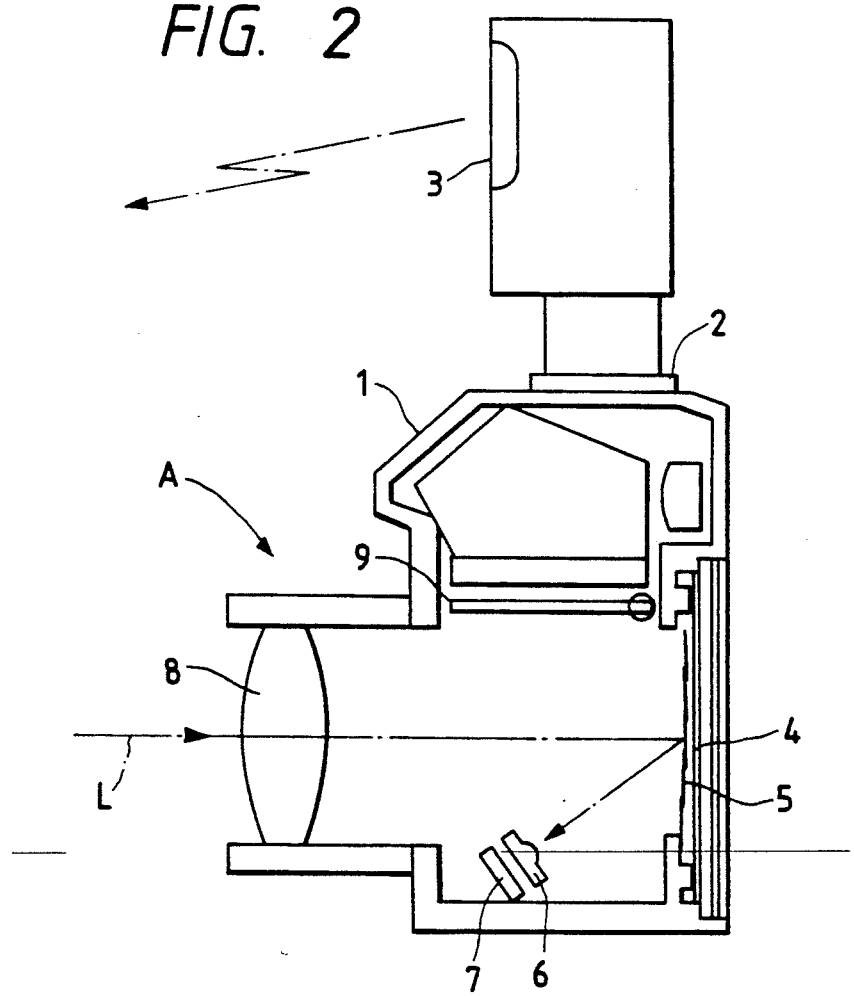
FIG. 2 is a cross-sectional view of a camera with a flash light source mounted thereon, showing an embodiment of the present invention.

FIG. 2 is a cross-sectional view of a camera with a flash light source mounted thereon, showing an embodiment of the present invention.

A flash light source 3 is mounted on an accessory shoe 2 at the upper portion of a camera 1. Flashing of the flash light source 3 is controlled by a flash control signal transmitted from the camera 1 through contacts provided in the accessory shoe 2. In the camera 1, a condenser lens 6 and a photoelectric converter 7 are disposed at a position where they receive a light reflected by the surface of a film 4 or of a preceding curtain 5 of a focal-plane shutter which covers the film surface.

During exposure, a movable mirror 9 and the preceding curtain 5 of the shutter are removed from an optical path. Hence, rays of light L from a subject pass through a taking lens 8 and reaches the surface of the film 4. Part of those rays of light is reflected by the surface of the film 4, passes through the condenser lens 6 and then reaches the photoelectric converter 7. During nonexposure, the rays of light L from the subject reach the surface of the preceding curtain 5 of the shutter disposed immediately in front of the film 4, as shown in FIG. 2. Part of the rays of light is reflected by the surface of the preceding curtain 5, passes through the condenser lens 6 and then reaches the photoelectric converter 7.

FIG. 3 shows the positional relation between the photoelectric converter 7 and the condenser lens 6. The photoelectric converter 7 consists of a central circular light-receiving element (hereinafter referred to as a "photodiode") PD1, and photodiodes PD2 through PD5 disposed on the right and left of the central light-receiving element PD1 and having the shape shown in FIG. 3. Each of the photodiodes PD1 through PD5 converts the intensity of light received into an electric signal, and outputs that electric signal. The condenser lens 6 consists of three lenses 6a through 6c which respectively converge the rays of light from the subject upon the photodiodes PD1 through PD5 of the photoelectric converter 7.

FIG. 4 shows the optical relation between an aperture area 11 on the surface of the film 4, the condenser lens 6 and the photoelectric converter 7, as seen when locking in the direction indicated by A in FIG. 2. The aperture area 11 on the surface of the film 4 is divided into an elliptical central portion 11a and four peripheral portions 11b through 11e. The aforementioned photodiodes PD1 through PD5 of the photoelectric converter 7 respectively correspond in terms of the shape to the divided portions 11a through 11e of the aperture area 11. That is, the central photodiode PD1 corresponds to the central portion 11a, the left photodiodes PD2 and PD3 respectively correspond to the left peripheral portions 11b and 11c, and the right photodiodes PD4 and PD5 respectively correspond to the right peripheral portions 11d and 11e. The light reflected by the central portion 11a of the aperture area 11 is converted upon the central photodiode PD1 of the photoelectric converter 7 through the central lens 6a of the condenser lens 6 so as to form an image substantially equal to the subject image formed on the central portion 11a on the surface of the film 4. Similarly, the lights reflected by the left peripheral portions 11b and 11c of the aperture area 11 are respectively converged upon the left photodiodes PD2 and PD3 through the left lens 6b to form images substantially the same as those formed on the left peripheral portions 11b and 11c. The lights reflected by the right peripheral portions 11d and 11e are respectively converged upon the right photodiodes PD4 and PD5 through the right lens 6c to form images substantially the same as those formed on the right peripheral portions 11d and 11e. The photodiodes PD1 through PD5 receive rays of light from the corresponding divided portions 11a through 11e of the surface of the film 4 for metering and detects field reflected light distribution data when preliminary or main flashing is conducted by the flash light source 3.

Figure 5:
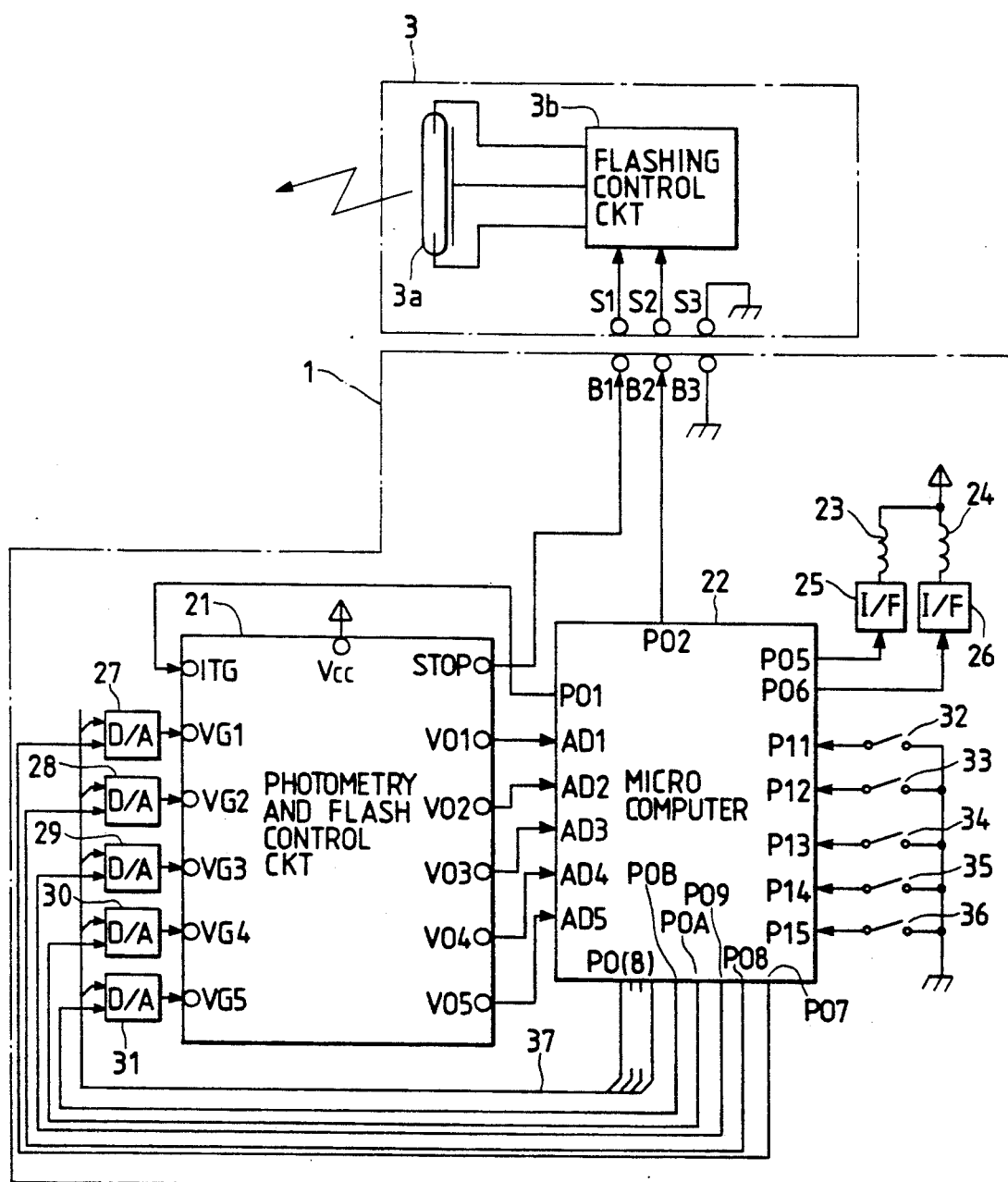
FIG. 5 is a block diagram of the embodiment of FIG. 1.

FIG. 5 is a circuit diagram of the camera and the flash light source according to the embodiment of the present invention.

The camera 1 includes a photometry and flash control circuit 21, a microcomputer 22, a magnet 23 for driving the preceding curtain, a magnet 24 for driving the following curtain, an interface circuit 25 for the preceding curtain, an interface circuit 26 for the following curtain, D/A converters 27 through 31 and switches 32 through 36.

The photometry and flash control circuit 21 first detects field reflected light distribution data on the basis of the photometric values of the photodiodes PD1 through PD5 of the photoelectric converter 7 transmits the obtained data to the microcomputer 22 from output terminals VO1 through VO5 when preliminary flashing is conducted. Next, the photometry and flash control circuit 21 receives the weighting values for the individual portions of the aperture area 11 calculated on the basis of the field reflected light distribution data from the microcomputer 22 through the D/A converters 27 through 31 at input terminals VG1 through VG5. Once main flashing is initiated, the photometry and flash control circuit 21 weights each of the photometric values of the photometric portions 11a through 11e in accordance with the weighting value thereof, and integrates the sum of the weighted values. When the integrated value reaches the predetermined value, the photometry and flash control circuit 21 outputs a flashing stop signal from an output terminal STOP to suspend flashing of the flash light source 3.

The microcomputer 22 includes a central processing unit, A/D converters, memory and so on. The microcomputer 22 executes the control program which will be described later, and thereby initiates flashing by a flashing starting signal output from an output terminal PO2 to the flash light source 3 and controls the magnets 23 and 24 for the preceding and following shutter curtains by shutter control signals output from output terminals PO5 and PO6.

Also, the microcomputer 22 controls the photometry and flash control circuit 21. More specifically, before preliminary flashing is initiated, the microcomputer 22 outputs the same gain setting voltage to all the D/A converters 27 through 31 from an output port PO (8) through a data bus. This gain setting voltage determines the amplification gain used when the photometric values of the photodiodes PD1 through PD5 are amplified in the photometry and flash control circuit 21. For preliminary flashing, the same amplification gain is set for each of the individual portions 11a and 11e, and field reflected light distribution is measured using the amplification gain. After preliminary flashing is completed, the microcomputer 22 receives the integrated values of the photometric values of the individual photometric portions 11a through 11e obtained during preliminary flashing from A/D converting input terminals AD1 through AD5 and processes the integrated values in accordance with a predetermined algorithm to determine the weighting values for the individual portions. Next, the microcomputer 22 outputs D/A converter selection signal from output ports PO7 through PO8 to make a selection of the D/A converters 27 through 31, and outputs a gain setting voltage for each of the individual portions corresponding to the D/A converters from the output port PO (8) through the data bus 37. This gain setting voltage differs in accordance with the weighting value of each of the individual portions 11a through 11e. Also, the microcomputer 22 outputs an integration control signal for integrating the photometric values of the photodiodes PD1 through PD5 from the output port PO1 to the photometry and flash control circuit 21 during the preliminary and main flashings.

The switch 32 is turned on when the movable mirror 9 is retracted from the optical path of the taking lens 8. The switch 33 is turned on when the focal-plane shutter is fully opened. The switch 34 is turned on when a shutter release button is fully pressed. The switch 35 is used to change over the TTL flash control mode. When the switch 35 is turned on, the aforementioned TTL multiple flashing control mode is selected. When the switch 35 is turned off, normal TTL average flash control mode is selected. The switch 36 is used to select the bracketing mode. When the switch 36 is turned on, the bracketing mode is selected. When the switch 36 is turned off, normal photographic mode is selected. Signals from these switches 32 through 36 are input to input terminals PI1 through PI5 with a pull-up resistor of the microcomputer 22.

The magnets 23 and 24 for the preceding and following shutter curtains lock the charged state of preceding and following shutter springs, respectively. The magnets 23 and 24 are driven by the microcomputer 22 through the interface circuits 25 and 26.

The flash light source 3 includes a known flash portion 3a and a known flash control circuit 3b. The flash control circuit 3b includes a voltage increasing circuit, a main capacitor, a flash control SCR and so on. Flashing of the flash portion 3a is controlled by a flash starting signal from the contact S2 and a flash stop signal from the contact S1.

As stated above, when the flash light source 3 is mounted on the accessory shoe 2 at the upper portion of the camera 1, the contacts B1 to B3 of the camera 1 are respectively connected to the contacts S1 to S3 of the flash light source 3 so that the flash initiating and stop signals can be supplied from the camera 1 to the flash light source 3. The contacts B3 and S3 are grounding terminals.

Figure 6:
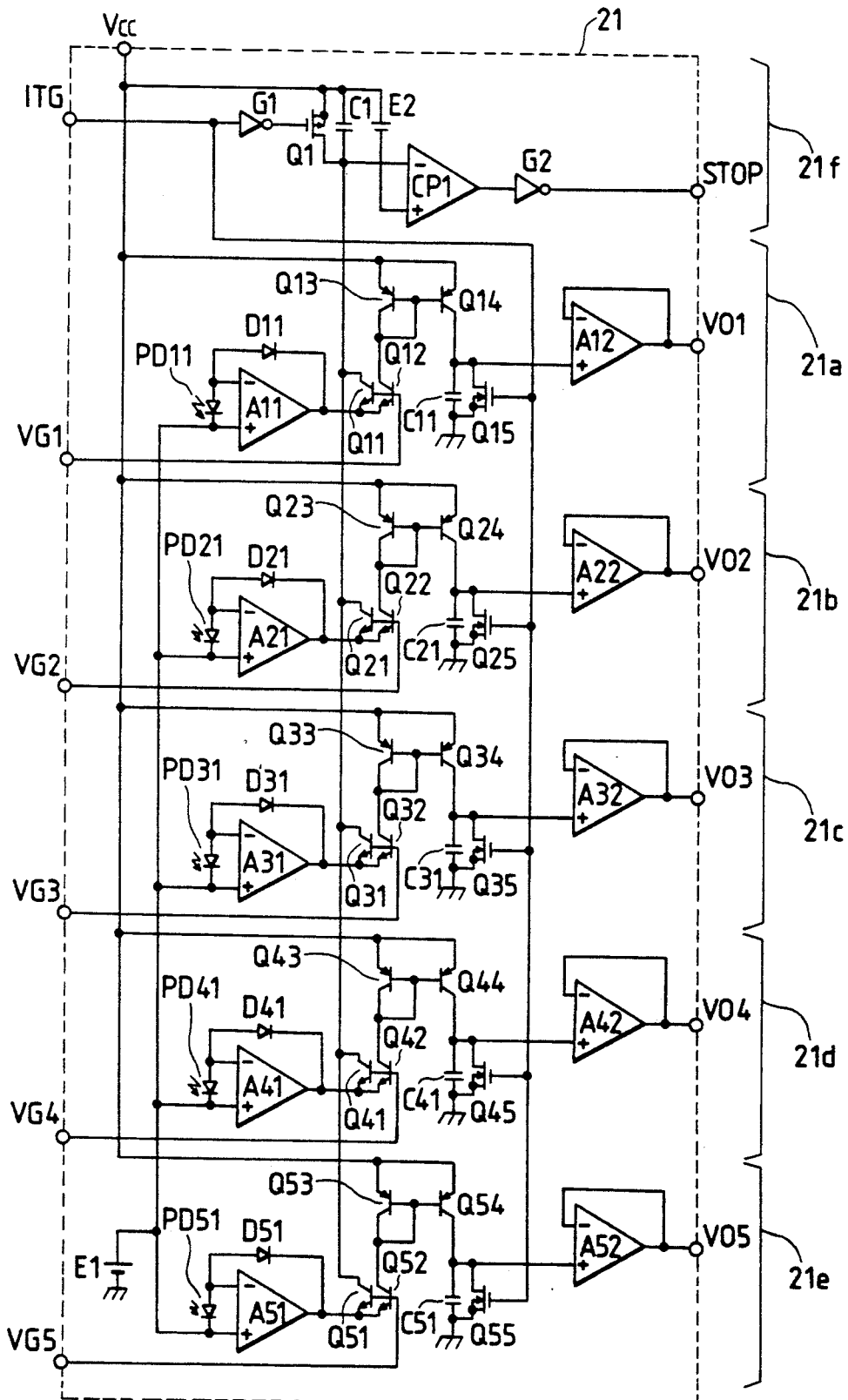
FIG. 6 is a circuit diagram of a photometry and flash control circuit of the embodiment of FIG. 5.

FIG. 6 shows the photometry and flash control circuit 21 in detail.

The photometry and flash control circuit 21 is divided into six circuit blocks 21a through 21f in terms of function. The circuits 21a through 21e perform metering of the divided portions 11a through 11e, amplify the photometric values in accordance with the weighting values of the portions 11a through 11e and then integrate and output the photometric values during preliminary and main flashings. The circuit 21a performs metering of the central portion 11a of the aperture area 11, the circuit 21b performs metering of the left and lower peripheral portion 11b, the circuit 21c performs metering of the left and upper peripheral portion 11c, the circuit 21d performs metering of the right and lower peripheral portion 11d, and the circuit 3 performs metering of the right and upper peripheral portion 11e. The circuit 21f outputs a flash stop signal to the flash light source 3 when the integrated value of the sum of the photometric values of the photometric portions 11a through 11e reaches a predetermined value during main flashing.

First, the operation of the circuit 21a which meters the central portion 11a will be described.

A current corresponding to the photometric value output from the photodiode PD1 for metering the central portion 11a is logarithmically compressed by an operational amplifier A11 to which a diode D11 is fed back, and is converted into a voltage using a reference voltage E1. The voltage output from the operational amplifier A11, corresponding to the photometric value of the central portion 11a, is supplied to emitters of transistors Q11 and Q12. The gain setting voltage from the input terminal VG1, corresponding to the weighting value, is supplied to bases of the transistors Q11 and Q12. Collector currents of the transistors Q11 and Q12 increase in proportion to the difference in the voltage between the bases and the emitters. That is, the photometric value of the central portion 11a is weighted by the weighting value, and is output as the collector currents of the transistors Q11 and Q12.

The collector currents of the transistors Q11 and Q12 are reversed by transistors Q13 and Q14 which constitute a current mirror circuit, and charge a capacitor C11. That is, the charging voltage of the capacitor C11 is an integrated value of the photometric value of the central portion 11a. The charging voltage of the capacitor C11 is output to the microcomputer 22 through a follower amplifier A12 and the output terminal VO1 as a voltage which indicates the integrated value of the photometric value. A FETQ 15 discharges the capacitor C11 in accordance with the integration control signal supplied to an input terminal ITG.

The operation of the circuits 21b through 21e is the same as that of the circuit 21a for the central portion 11a, description thereof being omitted.

The flash control operation of the circuit 21f will now be described in detail.

The corrector currents of transistors Q11 to Q51, corresponding to the photometric values of the individual portions 11a through 11e, are added to charge the capacitor C1. The voltage to which the capacitor C1 is charged is compared with reference voltage E2 by a comparator CP1. When the absolute value of the charging voltage of the capacitor C1 exceeds the absolute value of the reference voltage E2, the low level of the comparator CP1 is reversed to a high level, which is in turn reversed to a low level by an inverter G2. The low level signal is output from the output terminal STOP. That is, when the integrated value of the sum of the photometric values of the individual photometric portions 11a through 11e exceeds a predetermined value, a flashing stop signal is output to the flash light source 3. A FETQ1 discharges the capacitor C1 in accordance with the integration control signal from the input terminal ITG.

Figure 7:
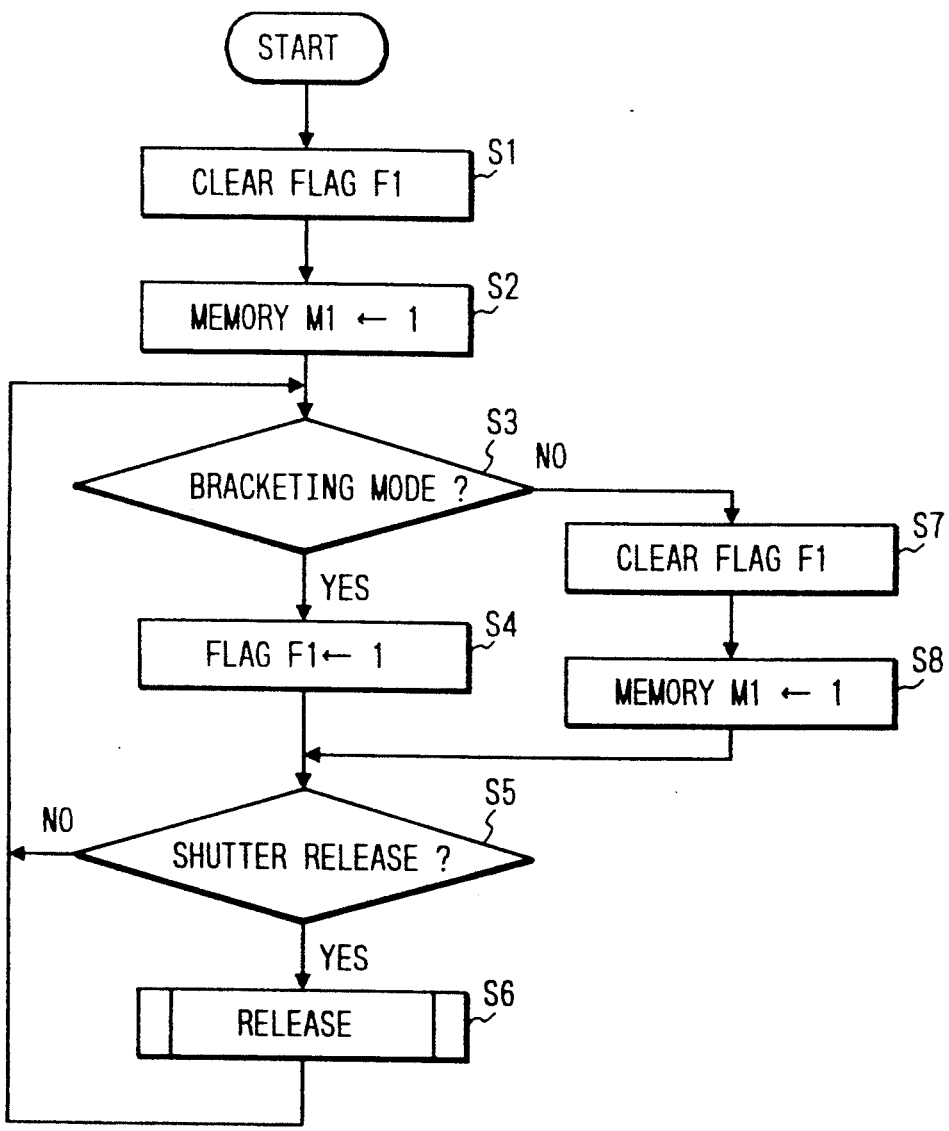
FIG. 7 is a flowchart showing the main control program executed by a microcomputer.
Figure 9:
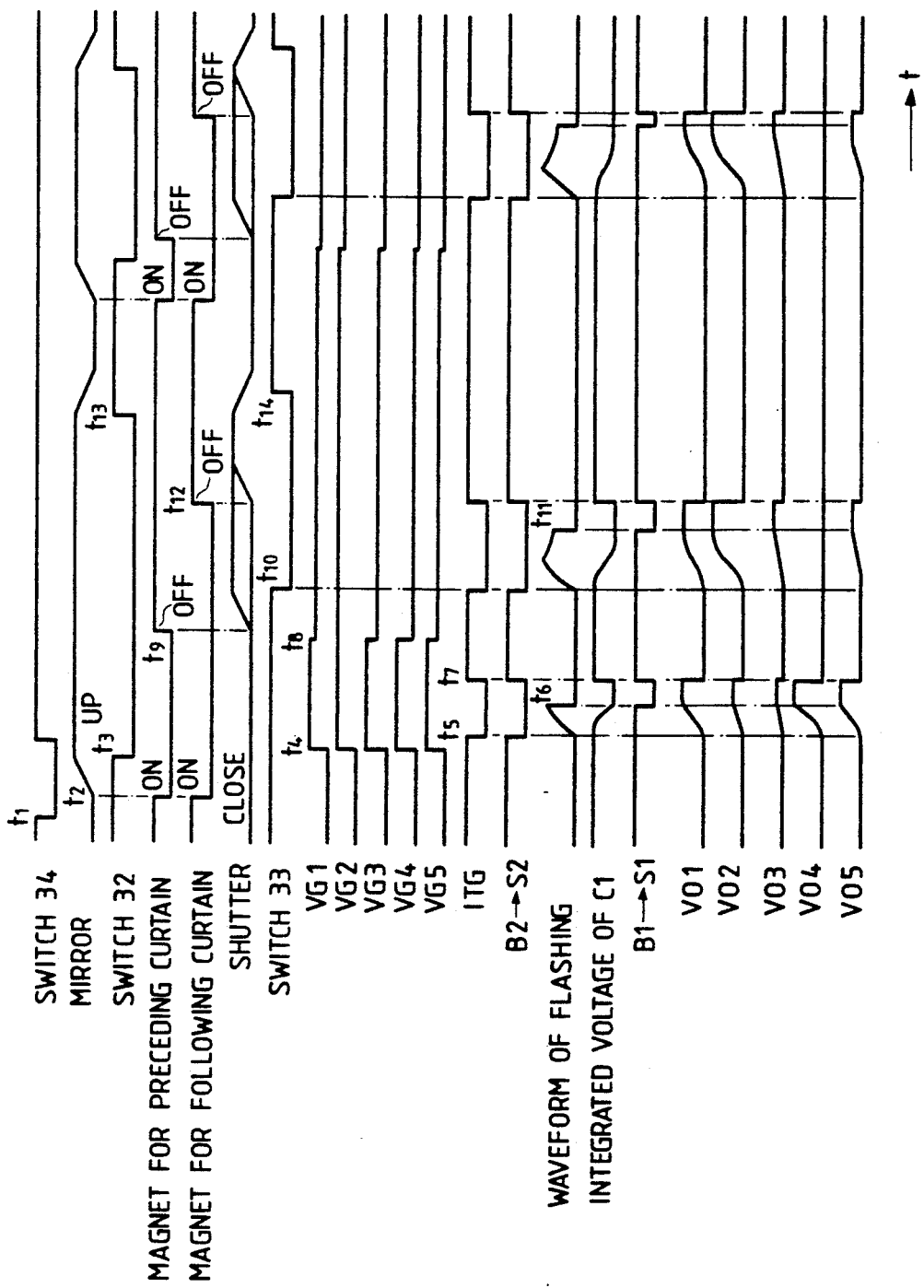
FIG. 9 is a time chart showing the operation of the individual circuits.

FIG. 7 is a flowchart showing the main program executed by the microcomputer, FIG. 8 is a flowchart showing a release subroutine of the main program, and FIG. 9 is a time chart showing the operations of the individual circuits shown in FIG. 5. The operation of the microcomputer will now be described with reference to these figures.

When the camera 1 is switched on, the microcomputer starts executing the main program shown in FIG. 7. After the main program is started, flag F1, indicating that the bracketing mode is selected, is cleared in step S1. Next, in step S2, 1 is stored in memory M1 which indicates frame No. for the bracketing mode. It is assumed in this embodiment that three shots are taken in total in the bracketing mode at different exposure values including an adequate exposure value and exposure values deviating from the adequate exposure value by one step. Thereafter, it is determined in step S3 by means of the switch 36 whether or not the bracketing mode is selected. If the bracketing mode is selected, the process goes to step S4. If the bracketing mode is not selected, the process goes to step S7. In step S4, 1 is assigned to flag F1. Thereafter, the process goes to step S5. If the bracketing mode is not selected, flag F1 is cleared in step S7, and then 1 is stored in the memory M1 in step S8. Thereafter, the process goes to step S5. In step S5, it is determined whether or not the shutter release button is fully pressed. If the button is fully pressed, the process goes to step S6, and the release subroutine shown in FIG. 8 is executed (at time t1 shown in FIG. 9). If the shutter release button is not fully pressed, the process returns to step S3.

If the shutter release button is fully pressed, the magnets 23 and 24 for the preceding and following shutter curtains are energized through the interface circuits 25 and 26 to lock the charging of the shutter springs in step S11 shown in FIG. 8. Thereafter, in step S12, the movable mirror 9 is retracted from the optical path L of the taking lens 8. In step S13, it is determined whether or not retraction of the movable mirror 9 is completed by means of the switch 32. If retraction is completed, the process goes to step S14, (at time t3 shown in FIG. 9), and it is determined whether or not TTL multiple flashing control mode is selected by means of the switch 35. If TTL multiple flashing control mode is selected, the process goes to step S15. If TTL multiple flashing control mode is not selected, the process goes to step S29. In step S15, it is determined whether or not 1 is assigned to flag F1, i.e., whether or not the bracketing mode is selected. If the bracketing mode is selected, the process goes to step S24. If the bracketing mode is not selected, the process goes to step S16. In step S24, it is determined whether or not 1 is stored in the memory M1. If the first frame for the bracketing mode exists, the process goes to step S16. If the first frame does not exist, the process goes to step S25.

In step S16 to S21, preliminary flashing control is performed. First, in step S16, the microcomputer 22 controls the D/A converters 27 through 31 through the data bus 37 and thereby applies the common gain setting voltage to the input terminals VG1 through VG5 of the photometry and flash control circuit 21 (at time t4 shown in FIG. 9). Next, in step S17, the microcomputer 22 outputs an integration control signal through the output terminal PO1 and thereby makes the capacitors C1 and C11 to C51 of the photometry and flash control circuit 21 start integration of the photometric values. At the same time, the microcomputer 22 outputs a flashing start signal through the output terminal PO2 to start preliminary flashing of the flash light source 3 (at time t5 shown in FIG. 9). Thereafter, in step S18, a predetermined time is awaited until the photometry and flash light circuit 21 completes metering of and flash control operation of preliminary flashing.

When preliminary flashing of the flash light source 3 is initiated, in the photometry and flash control circuit 21, the individual photometric portions 11a through 11d are metered by the photodiodes PD1 through PD5, and the electric signals corresponding to the photometric values are output. As stated above, the electric signals corresponding to the photometric values for the individual portions are amplified by the common amplification gain, and the capacitors C11 through C51 are charged by the amplified electric signals for the individual portions, as shown in FIG. 9. Concurrently with this, capacitor C1 is charged by the sum of these electric signals. In other words, integration of the photometric values is conducted. The terminal voltages of the capacitors C11 through C51, i.e., the integrated values of the photometric values for the individual photometric portions, are output from the output terminals VO1 through VO5 to the microcomputer 22. Also, when the charging voltage of the capacitor C1, which is the integrated value of the sum of the photometric values of the individual portions, reaches a predetermined value, the photometry and flash control circuit 21 outputs a flashing stop signal from the output terminal STOP at time t6 shown in FIG. 9 to stop preliminary flashing of the flash light source 3. Consequently, no light is reflected by the field, and charging of the capacitors C1 and C11 through C51 is stopped and the terminal voltages of the capacitors are thereby fixed, as shown in FIG. 9.

In step S19, the microcomputer 22 receives the terminal voltages of the capacitors C11 through C51 through the input terminals AD1 through AD5, and converts the received voltages into digital signals. Thereafter, in step S20, the microcomputer 22 processes these voltages in accordance with a predetermined multiple pattern operation algorithm to calculate the weighting values for the individual portions. Furthermore, the microcomputer 22 corrects the weighting values on the basis of the film speed and determines the gain setting voltage Vg(n) (n indicates the area No. and N = 1 to 5). The multiple pattern operation algorithm may be the one disclosed in the aforementioned U.S. Ser. No. 560,745. Since it is not related to this invention, description thereof is omitted. After the multiple pattern operation is completed, in step S21, the integration control signal and the flashing starting signal are reset for a main flashing to discharge the capacitors C1 and C11 through C51 of the photometry and flash control circuit 21 (at time t7 shown in FIG. 9). Thereafter, in step S22, it is determined again whether or not 1 is assigned to flag F1. If the bracketing mode is selected, the process goes to step S25. If the bracketing mode is not selected, the process goes to step S23.

In step S25, the microcomputer 22 controls the D/A converters 27 to 31 through the data bus 37 and thereby applies the gain setting voltage Vg1(n) calculated by the following equation to the input terminals VG1 to VG5 of the photometry and flash control circuit 21 (at time t8 shown in FIG. 9).

$$Vg1(n) = Vg(n) + \Delta V\{2 - (M1)\} \quad (1)$$

where V is an increment or decrement of the gain setting voltage at which the exposure value for bracketing photography is increased or decreased by a predetermined value for each frame, and (M1) is the present bracketing frame No. stored in the memory M1.

Next, in step S26, 1 is added in the bracketing frame No. memory M1, and then it is determined in step S27 whether or not bracketing frame No. is 4. If the frame No. is 4, the process goes to step S28, and 1 is stored in the memory M1. If frame No. is not 4, the process goes to step S30.

If it is determined in step S22 that the bracketing mode is not selected, the microcomputer 22 controls the D/A converters 27 through 31 and thereby applies the gain setting voltage Vg(n) calculated in step S20 to the input terminals VG1 through VG5 of the photometry and flash control circuit 21 (at time t8 shown in FIG. 9).

In step S30, the microcomputer 22 controls the interface circuit 25 and thereby de-energizes the magnet 23 for the preceding curtain to start the shutter release operation (at time t9 shown in FIG. 9). Subsequently, it is determined in step S31 whether or not the shutter is fully opened by means of the switch 33. If the shutter is fully opened, the process goes to step S32 (at time t10 shown in FIG. 9), and the microcomputer 22 outputs the integration control signal to start integration of the photometric values of the photometry and flash control circuit 21. The microcomputer 22 also outputs the flashing start signal to start main flashing of the flash light source 3. Thereafter, in step S33, counting of the shutter speed is started. At that time, the photometry and flash control circuit 21 amplifies the photometric values detected by the photodiodes PD1 through PD5 in accordance with the gain setting voltages corresponding to the weighting values for the individual portions, and charges the capacitor C1 by the sum of the currents corresponding to the amplified photometric values. When the charging voltage of the capacitor C1 reaches a predetermined value, the photometry and flash control circuit 21 reverses the low level of the output terminal STOP, as stated above, and thereby stops main flashing of the flash light source 3 (at time t11 shown in FIG. 9).

In step S34, at time t11 when a preset shutter speed has elapsed, the microcomputer 22 controls the interface circuit 26 and thereby deenergizes the magnet 24 for the following curtain to close the shutter. In step S35, the microcomputer 22 resets the integration control signal and the flashing start signal for subsequent main flashing, and thereby discharges the capacitors C1 and C11 through C51 of the photometry and flash control circuit 21.

Thereafter, the mirror driving mechanism is driven for a subsequent flashing photographic operation to move down the movable mirror 9 at time t13. Consequently, the switch 32 is turned off. Also, the shutter is driven and closed at time t14. Consequently, the switch 33 is turned off. Thus, flashing photographic operation for the first shot in the bracketing mode is completed, and the process returns to the main program shown in FIG. 7.

After the process returns to the main program shown in FIG. 7, the aforementioned process is executed again. If it is determined again in step S5 that the shutter is fully pressed, the release subroutine shown in FIG. 8 is executed to perform photography for the second shot. In that case, since it is determined in step S24 that 2 is stored in the bracketing frame No. memory M1, preliminary flashing in step S16 through S21 is not conducted and the process goes to step S25. In step S25, the gain setting voltage Vg1(n) for the second shot is calculated by the aforementioned equation (1), and the calculated voltage is applied to the input terminals VG1 through VG5 of the photometry and flash control circuit 21 through the D/A converters 27 to 31. Thereafter, main flashing is initiated and flashing photographic operation for the second shot is conducted. At that time, the flash light source 3 is controlled such that it assures an exposure value which is one step larger than that for the first shot.

In the flashing photographic operation for the third shot, preliminary flashing is not conducted, as in the case of the flashing photographic operation for the second shot, and a picture is taken with the main flashing of the flash light source. Flashing of the flash light source 3 is controlled such that it assures an exposure value which is one step larger than that for the second shot.

If it is determined in step S15 and the bracketing mode is not selected, it is determined in step S15 that the answer is negative, and the process from step S16 through step S21 is executed. That is, the gain setting voltage Vg(n) is calculated by conducting preliminary flashing for each photographic operation. Thereafter, it is determined in step S22 that the answer is negative, and the process goes to step S23, that is, main flashing is conducted by the gain setting voltage Vg(n).

If it is determined in step S14 that TTL multiple flashing control mode is not selected, flashing photographic operation is conducted in the average flashing control mode. In that case, preliminary flashing is not conducted, and the same gain setting voltage is calculated for all the divided portions on the basis of the film speed in step S29. Thereafter, the process goes to step S22 and it is determined whether or not the bracketing mode is selected. If it is determined in step S22 that the bracketing mode is selected, the gain setting voltage is corrected in accordance with frame No., and the corrected gain setting voltage is applied to the photometry and flash control circuit 21 in step S25. If it is determined in step S22 that the bracketing mode is not selected, the gain setting voltage calculated in step S29 is applied to the photometry and flashing control circuit 21. In order words, in the average flashing control mode, distribution of a field reflected light is not detected by preliminary flashing, and the same gain setting voltage is set for all the photometric portions for flashing.

As will be understood from the foregoing description, in the bracketing mode, the flash light source 3 is preliminarily flashed at least once before flashing photographic operation is conducted, and the field reflected light distribution data during the preliminary flashing is detected. The obtained data is processed according to a predetermined algorithm to calculate the weighting values for the individual photometric portions. During the flashing photographic operation, the photometric values of the individual photometric portions are weighted in accordance with the weighting values calculated during the preliminary flashing. When the integrated value of the sum of the weighted photometric values exceeds a predetermined value, main flashing is suspended. Thus, preliminary flashing is conducted once before series of bracketing photographic operations are started. Consequently, flashing energy stored in the main capacitor can be saved, and disability of flashing photographic operation due to shortage of charging energy of the main capacitor can thus be eliminated. Furthermore, since the number of times the main capacitor is charged and discharged is reduced, the life of the main capacitor is prolonged.

In the aforementioned embodiment, the bracketing mode has been described. However, the present invention can also be applied to the sequential flashing photographic operation in which pictures are taken on a plurality of frames using the same intensity of flashing light.

In the normal bracketing photography, while the intensity of flashing light which is flashed from the flash light device 3 is increased or decreased for each shot, the exposure value determined by both the aperture and the shutter speed is changed by a predetermined value for each shot. However, since changes in the exposure value determined by the aperture and the shutter speed are not related to the present invention, description thereof is omitted.

What is claimed is:

1. A TTL automatic flash control device for a flash light source for a camera, said device comprising:

flash control means for controlling flashing of said flash light source, in sequential flashing photographic operation mode in which a plurality of flashing photographic operations are conducted sequentially, said flash control means preliminarily flashing said flash light source at least once before the series of flashing photographic operations are initiated, thereafter, said flash control means performing main flashing of said flash light source for each shot;

weighting value operation means for detecting distribution of reflected light regarding a plurality of photometric areas obtained by dividing a field during the preliminary flashing and for calculating a weighting value for each of the photometric areas on the basis of the distribution of the reflected light; and quantity of light control means for metering each of the photometric areas on the basis of the weighting value thereof during the main flashing and to control a quantity of light emitted from said flash light source.

2. A TTL automatic flash control device according to claim 1, wherein in the sequential flashing photographic operation, the plurality of flashing photographic operations are sequentially conducted by pressing a release button once.

3. A TTL automatic flash control device according to claim 1, wherein the sequential flashing photographic operation comprises bracketing photography in which said quantity of light control means changes the quantity of light for each shot.

* * * * *